W. M. LYMAN.
HORSE BLANKET.
APPLICATION FILED MAR. 19, 1912.
1,042,807.
Patented Oct. 29, 1912.
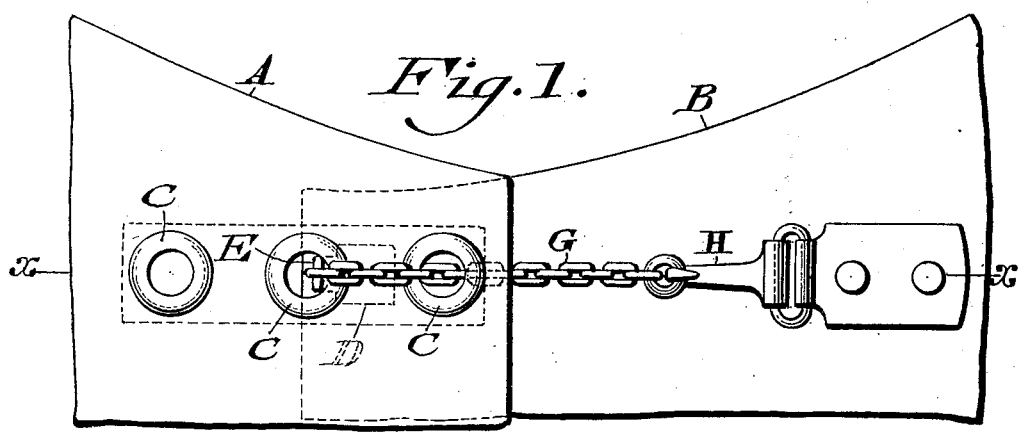
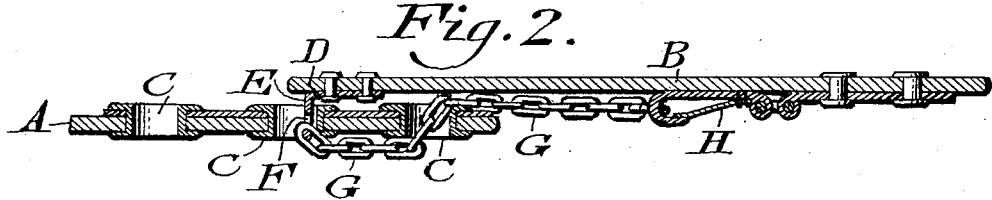
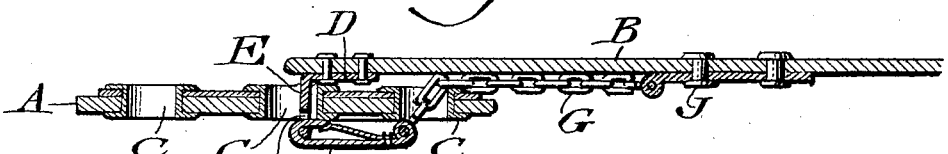
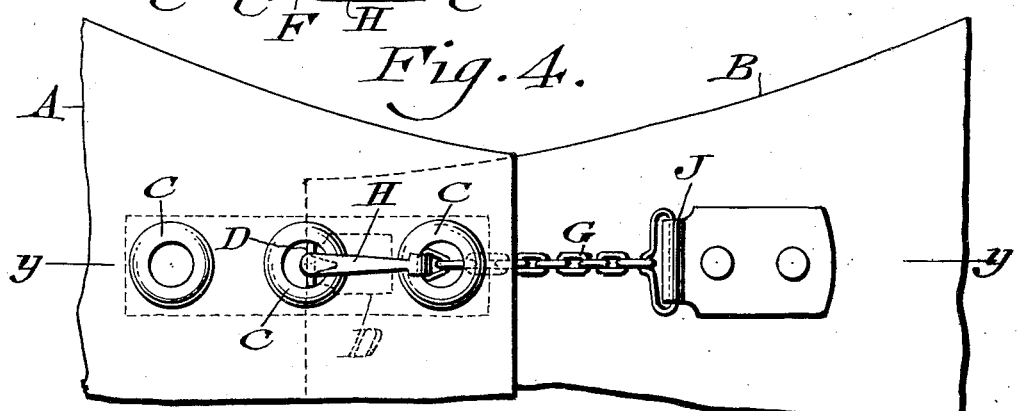
WITNESSES
INVENTOR
Walter M. Lyman
BY
ATTORNEYS

UNITED STATES PATENT OFFICE.

WALTER M. LYMAN, OF BALA, PENNSYLVANIA.

HORSE-BLANKET.

1,042,807. Specification of Letters Patent. Patented Oct. 29, 1912.

Application filed March 19, 1912. Serial No. 684,893.

*To all whom it may concern:*

Be it known that I, WALTER M. LYMAN, a citizen of the United States, residing at Bala, county of Montgomery, State of Pennsylvania, have invented a new and useful Horse-Blanket, of which the following is a specification.

My invention relates to a blanket for a horse or other animal consisting of an adjustable fastening for the open overlapping or flap members whereby the latter may be effectively closed and secured, prevented from dropping or sagging and adapted to be readily opened and separated as desired, said fastening being composed of a hook, and an elbow of rigid material fixed to one flap member, and a chain or flexible piece as a strap which is connectible with said elbow adapted to be passed through the other member and attached to said hook, thus providing for the ready connection and disconnection of said members and adapting the latter when connected, to be doubly sustained.

The invention is satisfactorily illustrated in the accompanying drawing, but the important instrumentalities thereof may be varied, and so it is to be understood that the invention is not limited to the specific arrangement and organization shown and described.

Figure 1 represents a front view of a portion of a horse blanket embodying my invention. Fig. 2 represents a horizontal longitudinal section thereof on line $x$—$x$ Fig. 1. Fig. 3 represents a perspective view of a detached portion. Fig. 4 represents a front view of a portion of another embodiment of the invention. Fig. 5 represents a horizontal longitudinal section thereof on line $y$—$y$, Fig. 4.

Similar letters of reference indicate corresponding parts in the figures.

Referring to the drawings:—A and B designate front members of a horse blanket, one overlapping the other as flaps.

In the member A are eyelets or gromets C which are arranged in horizontal alinement thereof.

D designates an elbow of rigid material whose inner limb is firmly secured to the end portion of the member B and has its other limb E adapted to enter the adjacent gromet and protrude therethrough, said limb having therein near its outer end an eye F for the connection of the chain or flexible member G as a strap which extends therefrom on the front of the member A, and is passed through the end gromet of said member to the rear of said member A, and then along the front of the other member B to the snap hook H which is secured to the latter at a suitable distance from the end of said member B, it being seen that the elbow D serves primarily to connect the members A, B and sustain the same while the chain G is being reeved through one or more gromets. Then said chain is connected with the snap hook H and so the members A, B, are doubly held-up viz., by said elbow and said chain, and so are prevented from sagging and improper disconnection.

When the chain is disengaged from the snap hook, it may be withdrawn from the end gromet that it occupies and with the elbow withdrawn from the other gromet, the members A, B, thus being no longer connected, permitting the blanket to be removed from the animal and reapplied subsequently thereto as desired when the members by passing the chain and elbow, through the proper gromet and the chain by itself through another gromet, said chain then being attached to the snap hook as before.

It is evident that the elbow may be fitted in either of the gromets relatively to the size of the neck of the animal thus adjusting the members A B, to said size.

In Figs. 4 and 5, the chain is connected at one end with the fastening J which is riveted to the member B, while the snap hook H on the other end of said chain is engaged with the eye F of the elbow without, however, producing different results in doubly supporting the ends of the members A B as in the previous case.

Having thus described my invention what I claim as new and desire to secure by Letters Patent, is:—

1. A blanket having overlapping end members, one of said members having a plurality of alined openings therein, an elbow on the other member having a limb adapted to enter one of said openings and engage with the wall thereof, a flexible piece adapted to extend from the end of said limb through another of said openings to the contiguous member, and the last named member having means thereon for the connection of said flexible piece therewith.

2. A blanket of the character stated having front and rear members one overlapping the other, the front member of which is provided with a series of alined openings therein, a rigid elbow, one limb of which is connected with the rear member, the other limb being provided with an eye which is adapted to pass through one of said openings, a flexible piece connected at one end with said eye on the exterior of the front member arranged to pass through an adjacent opening in the latter, and means on the rear member for the connection therewith of the other end of said flexible piece.

WALTER M. LYMAN.

Witnesses:
 JOHN A. WIEDERSHEIM,
 N. BUSSINGER.

Copies of this patent may be obtained for five cents each, by addressing the "Commissioner of Patents, Washington, D. C."